Jan. 18, 1966 W. H. STUDER 3,230,134
PLASTIC CARPET AND METHOD OF MAKING SAME
Filed Nov. 19, 1958 4 Sheets-Sheet 1
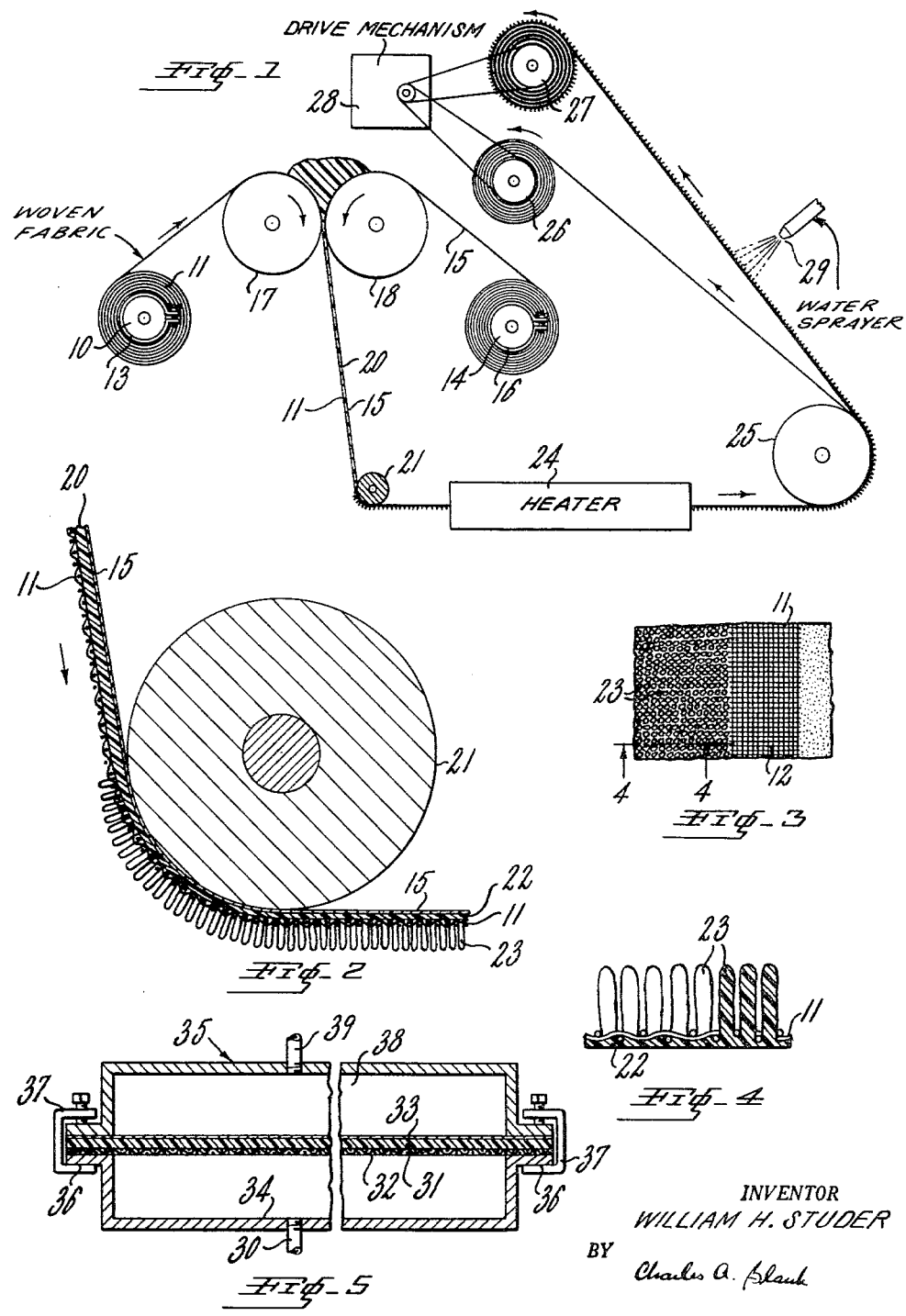
INVENTOR
WILLIAM H. STUDER
BY
Charles A. Blank
ATTORNEY Jan. 18, 1966 W. H. STUDER 3,230,134
PLASTIC CARPET AND METHOD OF MAKING SAME
Filed Nov. 19, 1958 4 Sheets-Sheet 2

INVENTOR
WILLIAM H. STUDER
BY
Charles A. Black
ATTORNEY

Jan. 18, 1966   W. H. STUDER   3,230,134
PLASTIC CARPET AND METHOD OF MAKING SAME
Filed Nov. 19, 1958   4 Sheets-Sheet 3

INVENTOR
WILLIAM H. STUDER
BY
Charles A. Blank
ATTORNEY

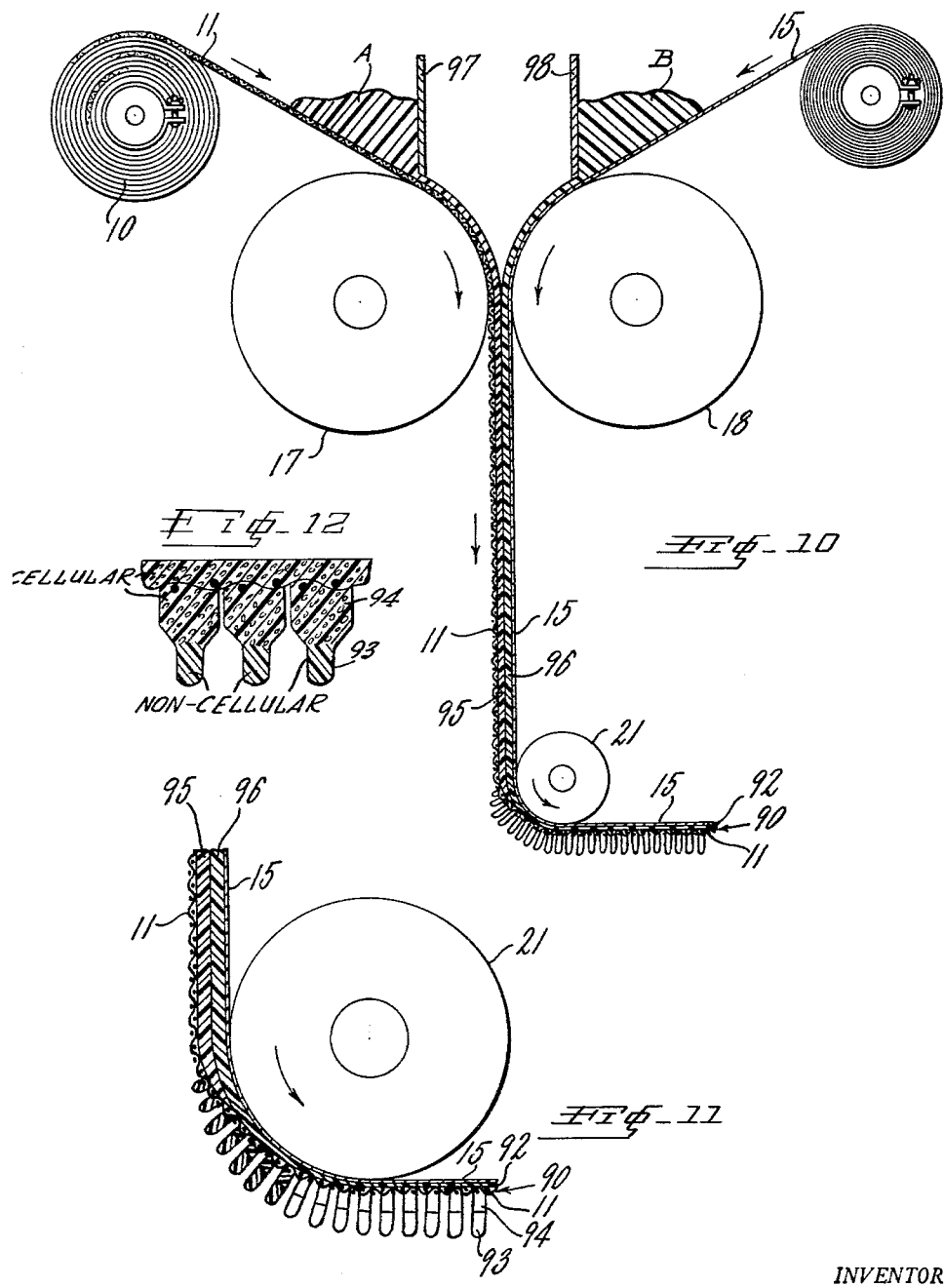

United States Patent Office 3,230,134
Patented Jan. 18, 1966

3,230,134
PLASTIC CARPET AND METHOD OF MAKING SAME
William H. Studer, Mishawaka, Ind., assignor to United States Rubber Company, New York, N.Y., a corporation of New Jersey
Filed Nov. 19, 1958, Ser. No. 774,937
4 Claims. (Cl. 161—62)

This invention relates to plastic sheet materials and methods of making such materials. As employed in this specification and claims, the term plastic is intended to refer to materials which are natural or synthetic rubber, natural or synthetic plastic, or a combination thereof, and includes organic thermoplastic and organic thermosetting resins.

The invention is particularly directed to methods of making plastic sheet materials which have the appearance of carpets. The invention is also directed to a plastic sheet material suitable for use as a carpet and having a tough outer wear surface while maintaining a high degree of resilience.

It is an object of the invention to provide a new and improved method of making plastic sheet material continuously.

It is another object of the invention to provide a new and improved method of making continuously plastic sheet material which is suitable for use in carpet or upholstery applications.

In accordance with a particular form of the invention, the method of making plastic sheet material having projections from one side thereof comprises the steps of moving a porous supporting sheet across a surface, and forcing a substantially uniform quantity of plastic material through the pores in said supporting sheet at the surface to form plastic projections on one side and a backing of plastic on the other side of the supporting sheet.

Also in accordance with the invention, a plastic sheet material comprises a sheet having a multitude of closely spaced interstices and a coating of organic plastic material on one side of the sheet. The sheet material also includes individual protuberances having tips of a first organic plastic material and bases of a second organic plastic material extending through the individual interstices of the sheet and anchored in the coating.

For a better understanding of the present invention together with other and further objects thereof, reference is had to the following description taken in connection with the accompanying drawings and its scope will be pointed out in the appended claims.

Referring to the drawings:

FIG. 1 is a diagrammatic view of apparatus utilized to make plastic sheet material in accordance with the method of the present invention;

FIG. 2 is an enlarged fragmentary view of a portion of the FIG. 1 apparatus;

FIG. 3 is a view, partly broken away, of plastic sheet material made in accordance with the method of the present invention;

FIG. 4 is a view, partly in section, taken along lines 4—4 of FIG. 3;

FIG. 5 is a view, in section, of another apparatus which may be utilized to construct the plastic sheet material in accordance with the method of the present invention;

FIG. 10 is a diagrammatic fragmentary view of apparatus utilized to make plastic sheet material in accordance with the invention;

FIG. 11 is an enlarged fragmentary view of a portion of the FIG. 10 apparatus, and FIG. 12 is a view, in section, of a plastic sheet material in accordance with the invention.

Figure 6:
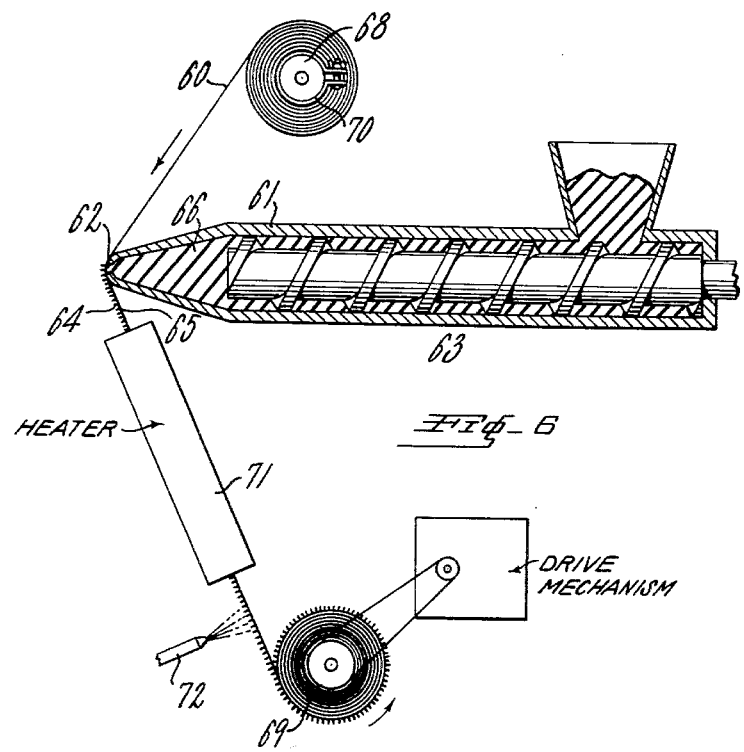
FIG. 6 is a fragmentary side view of another apparatus utilized to construct the plastic sheet material.

Referring now more particularly to FIG. 1 of the drawings, there is represented in diagrammatic view apparatus for making plastic sheet material, represented in FIGS. 3 and 4, in accordance with the method of the present invention. Roll 10 supports a sheet 11 having a multitude of closely spaced interstices. As is apparent in FIG. 3, the sheet 11 preferably is a woven sheet having a multitude of closely spaced meshes 12 but may be a perforated sheet. The sheet 11 may be any of a wide variety of materials, for example, cotton, rayon, nylon, plastic, paper, metal or glass. For example, the sheet 11 may be a cotton net fabric sized with starch and having 19 ends by 14 picks per inch. The fabric may be woven in a regular square pattern or may be woven to give a variety or pattern of mesh sizes and shapes to facilitate the manufacture of a plastic sheet material with plastic strands of a variety of sizes. Referring again to FIG. 1, a suitable brake band 13 surrounds a brake drum to control the tension on the sheet 11.

Roll 14 supports a backing sheet 15. The backing sheet may, for example, be a two mil polyester film known as "Mylar" and manufactured and sold by E. I. du Pont de Nemours and Co. The backing sheet may also be any of a variety of materials such as metal, cellophane, or paper. A suitable brake band 16 surrounds a brake drum to control the tension applied to the backing sheet.

Sheets 11 and 15 pass over rolls 17 and 18, respectively, where a quantity of plastic material may be introduced manually or otherwise between the sheets 11 and 15 to form a laminate comprising the perforated supporting sheet 11, a layer of plastic material 20, and the backing sheet 15. The laminate 11, 15, 20 may, for example, be .075 inch thick, as determined by the spacing between rolls 17, 18. The plastic material preferably is an organic thermoplastic material in the form of a thixotropic plastigel compound consisting principally of vinyl resins, plasticizers, stabilizers, pigments and gelling agent. A plastigel compound ordinarily is a plastisol compound in which gelling agents have been added to increase viscosity. Suitable compounded rubber or vinyl compositions and some plasticized vinyl compositions containing no gelling agent may also be employed. Sponge or blown compositions may be employed to provide a softer finish for the plastic sheet material, if desired. Typical compositions of suitable compounds are set forth hereinafter. Briefly, however, the plastic material preferably comprises a mixture of vinyl chloride copolymer plasticizer, stabilizer and gelling agent in the proportions corresponding to from 50 to 200 parts of plasticizer per 100 parts of vinyl chloride copolymer. The vinyl chloride copolymer may, for example, be a copolymer of vinyl chloride and minor proportions of diethyl maleate or a copolymer of vinyl chloride and minor proportions of vinylidene chloride or vinyl acetate.

The laminate 11, 20, 15 passes under tension around a roller 21 which forces a substantially uniform quantity of plastic material through the interstices or pores in the supporting sheet 11 to form plastic bristles or strands 23 on one side and a coating or backing 22 of plastic on the other side of the supporting sheet, as is more clearly represented in FIG. 2. The thixotropic plastigel material becomes fluid when subjected to the pressure of, for example, 10–40 pounds per square inch between the roller 21 and the sheet material.

As represented in FIG. 2 the coating 22 of plastic material is formed on the side of the sheet 11 adjacent the roller 21 and individual plastic strands 23 are forced downwardly through the individual interstices of the sheet 11 and are anchored in the coating to form plastic bristles projecting from the other side of the sheet 11. As is more clearly apparent in FIG. 4, the individual plastic strands 23 are of substantially the same length and preferably are in the range of $\frac{1}{32}$ to $\frac{3}{8}$ inches long to form a substantially uniform plastic pile for the mat. The strands preferably are almost contiguous and may, for example, have a center-to-center spacing in the range of $\frac{1}{32}$ to $\frac{3}{16}$ inches. The strands may have cross-sectional dimensions, for example, in the range of $\frac{1}{64}$ to $\frac{3}{16}$ inches and may take the form of nubs.

After the plastic sheet material 11, 20 passes the roller 21, it passes through a heater 24 which may, for example, comprise electrical heating units for curing the plastic material 20 with the bristles preferably projecting downwardly, thereby bonding together the supporting sheet 11, the coating 22, and the bristles 23. The plastic sheet material 11, 20 with backing sheet 15 then is drawn around a roll 25. The Mylar backing sheet 15 then is separated from the plastic sheet material 11, 20 and is drawn to windup roll 26 while the plastic sheet material 11, 20 is drawn to windup roll 27. Windup rolls 26 and 27 may be driven by any suitable means 28. Alternatively, the roll 14 and windup roll 26 may be eliminated and a continuous Mylar sheet may be disposed around rolls 18, 21 and 25 to serve as a suitable backing sheet.

As the plastic sheet material passes from roll 25 to roll 27, a suitable water sprayer 29 may be employed to cool the hot plastic surface.

Referring now to FIG. 5, there is represented diagrammatically apparatus for making pieces of plastic sheet material. This apparatus comprises a suitable housing 35 having supporting flanges 36 held together by clamps 37. The lower chamber 34 may be evacuated through outlet 30 or the upper chamber 38 may be pressurized through inlet 39. A layer of plastic material 31 is disposed against a porous sheet 32 (similar to the sheet 11 of FIG. 1) and a backing sheet 33 (similar to the backing sheet 15 of FIG. 1). The amount of plastic material in the laminate is controlled by rolling the laminate through a pre-set gap before tacking the laminate to the housing 35. By evacuating the lower chamber 34 or pressurizing the upper chamber 38, the pressure at the backing sheet 33 forces through the individual interstices of the sheet 32 individual plastic strands integral with the layer of plastic material 31 to form plastic bristles projecting from the sheet material and having a construction essentially the same as that represented in FIG. 4.

Small pieces of plastic sheet material can be made manually by spreading a layer of plastic on one side of a supporting fabric with a spatula and forcing some of the plastic material through the interstices of the fabric while spreading the plastic.

Figure 7:
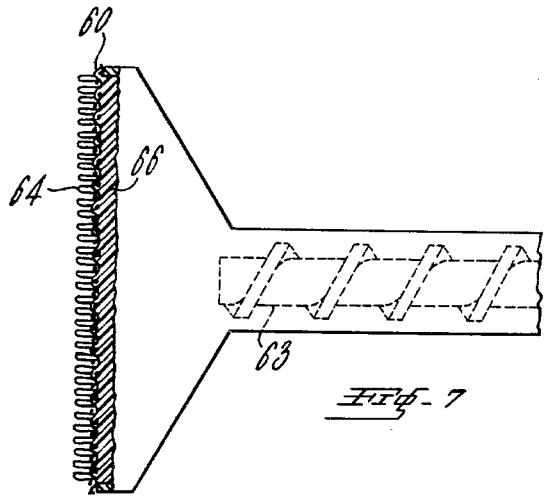
FIG. 7 is a plan view of the extrusion head of the FIG. 6 apparatus, partly broken away.

Referring now to FIGS. 6 and 7, there is represented apparatus for making plastic sheet material of the present invention in accordance with the following method. A supporting sheet 60 (similar to sheet 11 of FIG. 1) is moved across an extrusion head 61 at a substantially constant speed and under tension to press the sheet against the curved surface 62 of the head. A screw 63 is employed to control extrusion of plastic material 66 at a substantially constant rate through the interstices of the supporting sheet to form plastic bristles 64 on one side and a coating of plastic 65 on the other side of the supporting sheet. Suitable take-off and windup rolls 68, 69, brake band 70, heater 71, and sprayer 72 are employed in a manner similar to the corresponding elements of the FIG. 1 apparatus.

Figure 8:
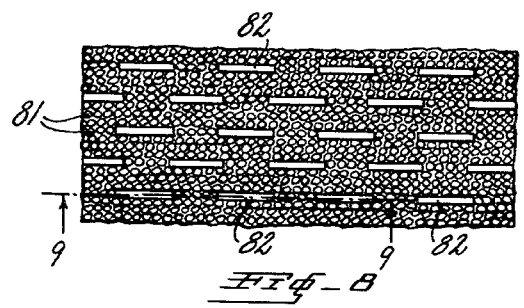
FIG. 8 is a plan view of a plastic sheet material constructed in accordance with the method of the present invention.
Figure 9:
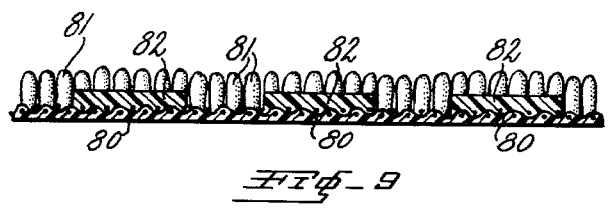
FIG. 9 is a view, in section, of the FIG. 8 sheet material.

Design patterns may be introduced into the sheet material in the manner represented in FIGS. 8 and 9. Regions 80 of the mesh of the supporting fabric are coated with, for example, a plastisol composition such as described in White Patent 2,831,824. This coating may be applied by a suitable stencilling operation and is then fused. Thereafter an extrusion operation such as previously described is performed to extrude plastigel strands 81 through the remaining uncoated meshes of the fabric. The coated regions 80 and the strands 81 preferably have suitable contrasting colors.

Referring now to FIGS. 10 and 11, there is represented diagrammatically apparatus for manufacturing plastic sheet material 90 in accordance with the invention. The plastic sheet material comprises a sheet 11 having a multitude of closely spaced interstices and a coating 92 of plastic material B on one side of the sheet. The plastic sheet material 90 also has individual protuberances having tips 93 of a first plastic material A and bases 94 of a second plastic material B extending through the individual interstices of the sheet and anchored in the coating. More particularly, the tips 93 preferably are of an organic thermoplastic material, for example, plasticized vinyl chloride copolymer to provide a tough non-cellular surface and the bases 94 preferably are of an organic thermoplastic material, such as plasticized vinyl chloride copolymer which becomes a sponge material during fusion, to provide resilience for the pile of the sheet material.

The apparatus for manufacturing the plastic sheet material is generally similar to the FIG. 1 apparatus and similar elements have been given the same reference numerals. Certain elements such as the heater 24, sprayer 29, windup rolls 26 and 27 and the drive mechanism 28 have been omitted from FIG. 10 but it should be understood that they are employed in a manner similar to that represented in FIG. 1.

Two banks of plastic material A and B are utilized. The first bank A preferably is plasticized vinyl chloride copolymer while the second bank B preferably is plasticized vinyl chloride copolymer containing a blowing agent to form sponge during fusion. The banks A and B are carried by fabric sheet 11 and Mylar sheet 15, respectively, under bank bars 97, 98 to form layers 95, 96 of plastic material. The first layer of plasticized vinyl chloride copolymer is disposed in intimate contact with the sheet 11 while the second layer of plasticized vinyl chloride copolymer is disposed in intimate contact with the first layer and the Mylar sheet 15. As represented in FIG. 11, as laminate 11, 95, 96, 15 passes around roller 21, the plastic materials are forced substantially uniformly through the pores or interstices in the supporting sheet 11 to form bristles having tips 93 of plasticized vinyl chloride copolymer and bases 94 of plasticized vinyl chloride copolymer which becomes a sponge material during fusion. A backing 92 of plastic material B remains on the other side of the supporting sheet for anchoring the bristles.

During fusion, the bases 94 of the plastic sheet material and the backing 92 become sponge material, as represented in sectional view in FIG. 12.

Thus, in accordance with the invention, a plastic sheet material may be manufactured utilizing a plurality of compositions to provide different characteristics for different portions of the finished article.

The following formulations are representative examples of compositions which may be employed to manufacture plastic sheet material in accordance with the method of the present invention.

*Vinyl plastigel—Formula PG–8*

Ingredients: Parts
    Vinyl chloride (Pliovic AO, copolymer of vinyl
      chloride and diethyl maleate—95/5) _____ 100
    Plasticizer—dioctyl phthalate _____ 78
    Aluminum stearate gel (10% solids in butyl
      benzyl phthalate) _____ 8

Pigments—titanium dioxide _____ 11
Stabilizer—25% Dythal-Plumb-O-Sil in dicapryl
  phthalate _____ 16
Thickening or gelling agent—Bentone 34 (dimethyldioctadecyl ammonium bentonite)___ 4

All ingredients are mixed in a conventional Hobart mixer, with the exception of the Bentone. When all the ingredients, other than Bentone, have been properly blended, the Bentone is added slowly, with the mixer operating at low speed. The compound is further mixed in the Hobart mixer for approximately 3 hours. Care should be taken to prevent a heat build-up in the compound during mixing to prevent premature gelation of the plastigel during mixing. This compound requires 6 minutes at 360° F. for proper fusion.

*Vinyl plastigel—Formula PG–7*

Ingredients: Parts
  Vinyl chloride (Pliovic AO, a copolymer of
    vinylchloride and diethyl maleate—95/5)__ 100
  Plasticizer—dioctyl phthalate _____ 50
  Stabilizer—25% Dythal-Plumb-O-Sil in dicapryl
    phthalate _____ 40
  Pigment—titanium dioxide _____ 10.5
  Gelling agent or thickener—Bentone 34 _____ 7.0

The mixing requirements of PG–7 are the same as PG–8. The fusion requirement is 6 minutes at 360° F.

*Soft Rubber*

Ingredients: Parts
  Reclaim rubber _____ 100
  Ribbed smoked sheet _____ 50
  Peptizing agent—RPA (xylyl mercaptan in
    inert hydrocarbon) _____ 5
  Stearic acid _____ 1
  Petrolatum _____ 30
  Paraffin oil _____ 15
  Filler—clay (Silene F.F.) _____ 10
  Zinc oxide _____ 5
  Sulfur _____ 2.5
  Altax (benzo thiazyl disulfide) _____ .5
  Accelerator—Monex (tetramethyl thiuram
    monosulfide) _____ .5
  Pigment _____ 2.0

The ribbed smoked sheet and RPA are milled separately on a cold mill for approximately 10 minutes before adding to the above formula. All of the above ingredients are then mixed in a cold Banbury mixer, adding the gums first and allowing to mix for 3 minutes. At that point all other ingredients are added.

The following are representative formulations for vinyl sponge and rubber sponge:

*Vinyl sponge*

Ingredients: Parts by weight
  Vinyl chloride (Pliovic AO, a copolymer of
    vinyl chloride and diethyl maleate—95/5) __ 100
  Plasticizer—dioctyl phthalate _____ 45
  Plastitcizer—dicapryl phthalate _____ 47
  Silica—Santocel C _____ 7.5
  Pigment _____ 2.0
  $Sb_2O_3$ (70% in butyl benzyl phthalate) _____ 5.0
  Stabilizer—128-V-5 (barium cadmium compound-modified coprecipitated laurate) ____ 4.0
  Blowing agent (Celogen AZ azodicarbonamide
    33% in dioctyl phthalate) _____ 5

All ingredients are mixed in a Hobart mixer with the exception of the Santocel C. When all of the other ingredients have been mixed, the Santocel C is added slowly with the mixer operating at low speed. The entire batch is then mixed an additional hour, during which time care is taken to prevent a heat buildup as there is some possibility of premature gellation of the plastigel. This compound requires 6 minutes at 360° F. for proper fusion.

*Formula 805–11—rubber sponge*

Ingredients: Parts by weight
  #1 flat bark (low grade natural rubber) _____ 94.0
  Zinc oxide _____ 4.8
  RPA (xylyl mercaptan in inert hydrocarbon) __ 1.0
  Laurex (zinc salts of a mixture of fatty acids,
    predominantly lauric acid) _____ .3
  Smoked sheet _____ 2.7
  DOTG (diortho tolylguanidine) _____ 2.7
  GR–S 1061 _____ .8
  Monex (tetramethylthiuram monosulfide) _____ .2
  Whiting _____ 38.5
  Soda bicarbonate _____ 39.0
  Paraffin wax _____ 2.6
  Paraffin oil _____ 5.5
  Titanox A (titanium dioxide) _____ 4.7
  Stabilite white—antioxidant (N,N-diphenylethylene diamine) _____ 1.0
  Stearic acid _____ 14.0
  Sulfur _____ 3.7
  MBTS (benzothiazyl disulfide) _____ .58

All of the above ingredients with the exception of the MBTS, are mixed in a Banbury. After all other ingredients are mixed, the MBTS is added to the Banbury. It is necessary to pre-heat this compound to 200°–250° F. before placing between rolls 17 and 18. This composition requires a cure (hot air) of 7 minutes at 350° F.

From the foregoing description, it will be apparent that the method of making plastic sheet material in accordance with the invention has several advantages. The plastic sheet material can be manufactured with the highly desirable appearance of a carpet with a substantially uniform pile and yet is relatively inexpensive to manufacture. The sheet material can be made continuously and thus can be produced commercially. Patterns may be introduced into the plastic sheet material by, for example, employing a supporting fabric sheet having a weave pattern which varies the size or shape of the meshes over the surface of the fabric. Also, by utilizing a plurality of plastic materials having different characteristics a carpet having the desired characteristics of both materials can be manufactured. Thus a carpet having a pile with a tough wear surface and yet having a high degree of resilience can be manufactured.

While there have been described what are at present considered to be the preferred embodiments of this invention, it will be obvious to those skilled in the art that various changes and modifications may be made therein without departing from the invention, and it is, therefore, aimed to cover all such changes and modifications as fall within the true spirit and scope of the invention.

Having thus described my invention what I claim, and desire to protect by Letters Patent is:

1. A plastic carpet comprising a sheet having a multitude of closely spaced individual interstices, a coating of plastic material on one side of said sheet, and individual strands having tips of a first organic plastic material with a tough surface, said strands having bases of an organic plastic sponge material extending through the individual interstices of said sheet and anchored in said coating.

2. A plastic carpet comprising a sheet having a multitude of closely spaced interstices, a coating of plasticized vinyl chloride copolymer on one side of said sheet, and individual strands having tips of plasticized vinyl chloride copolymer and bases of plasticized vinyl chloride copolymer sponge extending through the individual interstices of said sheet and anchored in said coating.

3. The method of making a plastic carpet having bristles projecting from one side thereof comprising the steps of positioning an open mesh fabric supporting sheet having a multitude of closely spaced interstices, disposing a first layer of a first plastic material selected from the group consisting of vinyl thermoplastics and rubber in intimate face-to-face contact with said supporting sheet, disposing a second layer of a second plastic material selected from said group and containing a blowing agent in intimate face-to-face contact with said first layer, and continuously moving said sheet under tension while bending said sheet around the surface of a member extending transversely of said sheet to place said plastic materials under pressure across said surface to force said plastic materials substantially uniformly through the individual interstices in said supporting sheet to form bristles having tips of said first plastic material and bases of said second plastic material and extending through the individual interstices of said supporting sheet, and to form a backing of plastic material on the other side of said supporting sheet for anchoring said bristles, and curing said plastic materials to impart a tough surface to said bristle tips and to cause said bristle bases and said backing to become sponge.

4. The method of making a plastitc carpet having bristles projecting from one side thereof comprising the steps of positioning an open mesh fabric supporting sheet having a multitude of closely spaced interstices, disposing a first layer of plasticized vinyl chloride copolymer in intimate face-to-face contact with said supporting sheet, disposing a second layer of plasticized vinyl chloride copolymer containing a blowing agent in intimate face-to-face contact with said first layer and continuously moving said sheet under tension while bending said sheet around the surface of a member extending transversely of said sheet to place said plastic materials under pressure across said surface to force said plastic materials substantially uniformly through the individual interstices in said supporting sheet to form bristles having tips of plasticized vinyl chloride copolymer and bases of plasticized vinyl chloride containing said blowing agent and extending through the individual interstices of said supporting sheet, and to form a backing of plastic material on the other side of said supporting sheet for anchoring said bristles, and fusing said plastic materials to impart a tough surface to said bristle tips and to cause said bristle bases and said backing to become sponge.

References Cited by the Examiner

UNITED STATES PATENTS

| | | |
|---|---|---|
| 2,217,137 | 10/1940 | Roth et al. |
| 2,339,142 | 1/1944 | Bodle et al. _____ 154—49.29 |
| 2,622,052 | 12/1952 | Chandler _____ 154—127 X |
| 2,688,581 | 9/1954 | Stubbs _____ 154—102 |
| 2,739,919 | 3/1956 | Artzt _____ 154—95 |
| 2,776,233 | 1/1957 | Roberts _____ 154—49.29 |
| 2,782,461 | 2/1957 | Esslinger. |
| 2,813,052 | 11/1957 | Lancaster _____ 154—95 |
| 2,816,853 | 12/1957 | Meyers _____ 154—127 XR |

EARL M. BERGERT, *Primary Examiner.*

J. S. BAILEY, CARL F. KRAFFT, *Examiners.*